(12) United States Patent
Chen (10) Patent No.: US 9,122,079 B2
(45) Date of Patent: Sep. 1, 2015

(54) TEMPLE ASSEMBLY FOR EYEWEAR

(71) Applicant: Advanced Eye Protection IP Holding, Park City, UT (US)

(72) Inventor: Stephen Charles Chen, Park City, UT (US)

(73) Assignee: Advanced Eye Protection IP Holding, Park City, UT (US)

( * ) Notice: Subject to any disclaimer, the term of this patent is extended or adjusted under 35 U.S.C. 154(b) by 8 days.

(21) Appl. No.: 14/029,563

(22) Filed: Sep. 17, 2013

(65) Prior Publication Data

US 2014/0092358 A1     Apr. 3, 2014

Related U.S. Application Data

(60) Provisional application No. 61/707,525, filed on Sep. 28, 2012.

(51) Int. Cl.
*G02C 5/22* (2006.01)
*G02C 5/16* (2006.01)

(52) U.S. Cl.
CPC ............... *G02C 5/2218* (2013.01); *G02C 5/16* (2013.01)

(58) Field of Classification Search
CPC .............. G02B 27/0176; G02B 2027/0178; G02C 5/16; G02C 5/2209; G02C 5/2227
USPC ............ 351/106, 122, 117, 91, 93, 113–115, 351/124, 126; 315/93
See application file for complete search history.

(56) References Cited

U.S. PATENT DOCUMENTS

| | | | | |
|---|---|---|---|---|
| 4,991,258 | A | * | 2/1991 | Drlik ............................... 16/228 |
| 5,528,320 | A | * | 6/1996 | Specht et al. .................. 351/106 |
| 5,644,800 | A | * | 7/1997 | Leonardi ........................... 2/431 |
| 5,666,181 | A | | 9/1997 | Conway |
| 2003/0020866 | A1 | * | 1/2003 | Asano ........................... 351/122 |
| 2008/0013036 | A1 | | 1/2008 | Daems et al. |
| 2011/0080556 | A1 | * | 4/2011 | Yee et al. ...................... 351/114 |
| 2013/0258270 | A1 | * | 10/2013 | Cazalet et al. ................ 351/114 |

FOREIGN PATENT DOCUMENTS

| | | |
|---|---|---|
| WO | 9424603 | 10/1994 |
| WO | 2004051348 | 6/2004 |

* cited by examiner

*Primary Examiner* — Darryl J Collins
*Assistant Examiner* — Journey Sumlar
(74) *Attorney, Agent, or Firm* — Maschoff Brennan (57) ABSTRACT

An example embodiment includes eyewear. The eyewear includes a lens, a brow piece, and two temple assemblies. The brow piece is configured to secure the lens. The two temple assemblies are coupled to the brow piece by two hinges. Each temple assembly includes a temple substrate, a covered portion, and a metal insert. The covered portion is formed on the temple substrate. The metal insert is located within the temple substrate. The metal insert is configured to impose a spring load against a head of a user to secure the eyewear to the head.

20 Claims, 7 Drawing Sheets

TEMPLE ASSEMBLY FOR EYEWEAR

CROSS-REFERENCE TO RELATED APPLICATIONS

This patent application claims the benefit of and priority to U.S. Provisional Patent Application No. 61/707,525, filed Sep. 28, 2012, which is incorporated herein by reference in its entirety.

FIELD

Some embodiments described herein relate to eyewear. More particularly, some example embodiments relate to a temple assembly for protective eyewear.

BACKGROUND

Eyewear is increasingly worn during activities to protect a user's eyes and/or face. For example, protective eyewear is worn regularly by military personnel, athletes, police officers, machinists, etc. During some of the activities performed, the user may also wear additional equipment. The additional equipment may be related to the activities performed and/or may provide additional protection to the user. For example, a military person may wear protective eyewear, a helmet, and radio equipment that fit over the ears and/or the head of the military person.

Some attempts have been made to combine eyewear with the additional equipment. For example, eyewear is permanently attached to a helmet or hearing protection equipment. In addition, some eyewear has been developed that is meant to be used in conjunction with specific equipment, including eyewear with short temple pieces, wire framed eyewear with plastically deformable temple pieces, etc. However, wearing these examples of eyewear in conjunction with the additional equipment creates user discomfort and/or limits the functionality of the eyewear without the additional equipment.

The subject matter claimed herein is not limited to embodiments that solve any disadvantages or that operate only in environments such as those described above. Rather, this background is only provided to illustrate one example technology area where some embodiments described herein may be practiced.

SUMMARY

An example embodiment includes eyewear. The eyewear includes a lens, a brow piece, and two temple assemblies. The brow piece is configured be secure the lens. The two temple assemblies are coupled to the brow piece by two hinges. Each temple assembly includes a temple substrate, a covered portion, and a metal insert. The covered portion is formed on the temple substrate. The metal insert is located within the temple substrate. The metal insert is configured to impose a spring load against a head of a user to secure the eyewear to the head.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

To further clarify the above and other advantages and features of some embodiments, a more particular description will be rendered by reference to specific embodiments thereof which are illustrated in the appended drawings. It is appreciated that these drawings depict only typical embodiments and are therefore not to be considered limiting of its scope. The invention will be described and explained with additional specificity and detail through the use of the accompanying drawings in which.

DESCRIPTION OF SOME EXAMPLE EMBODIMENTS

An example embodiment includes eyewear with temple assemblies that comfortably retain and secure the eyewear to the user. The eyewear is configured such that is may be worn in combination with additional equipment such as hearing and head protection. The temple assemblies are configured to reduce or eliminate discomfort due to pressure imposed against the ears or head of the user by the additional equipment while maintaining the function of the additional equipment and the eyewear. The temple assemblies include a metal insert and a temple substrate. The metal insert may be located within the temple substrate and is configured to apply an inward force against the head of a user. The position of the metal insert within the temple substrate may be above the ears of the user.

The temple substrate is configured to support the metal insert and to conform and contour to the head of the user. The temple assemblies may also include a covered portion formed along the temple substrate. The covered portion may be thin and composed of a pliable material. Additionally, the covered portion may be configured to be positioned behind the ears of the user such that pressure imposed against the ears of the user by the additional equipment presses the ears against the covered portion. Some additional example embodiments are described in conjunction with the appended drawings.

Figure 1:
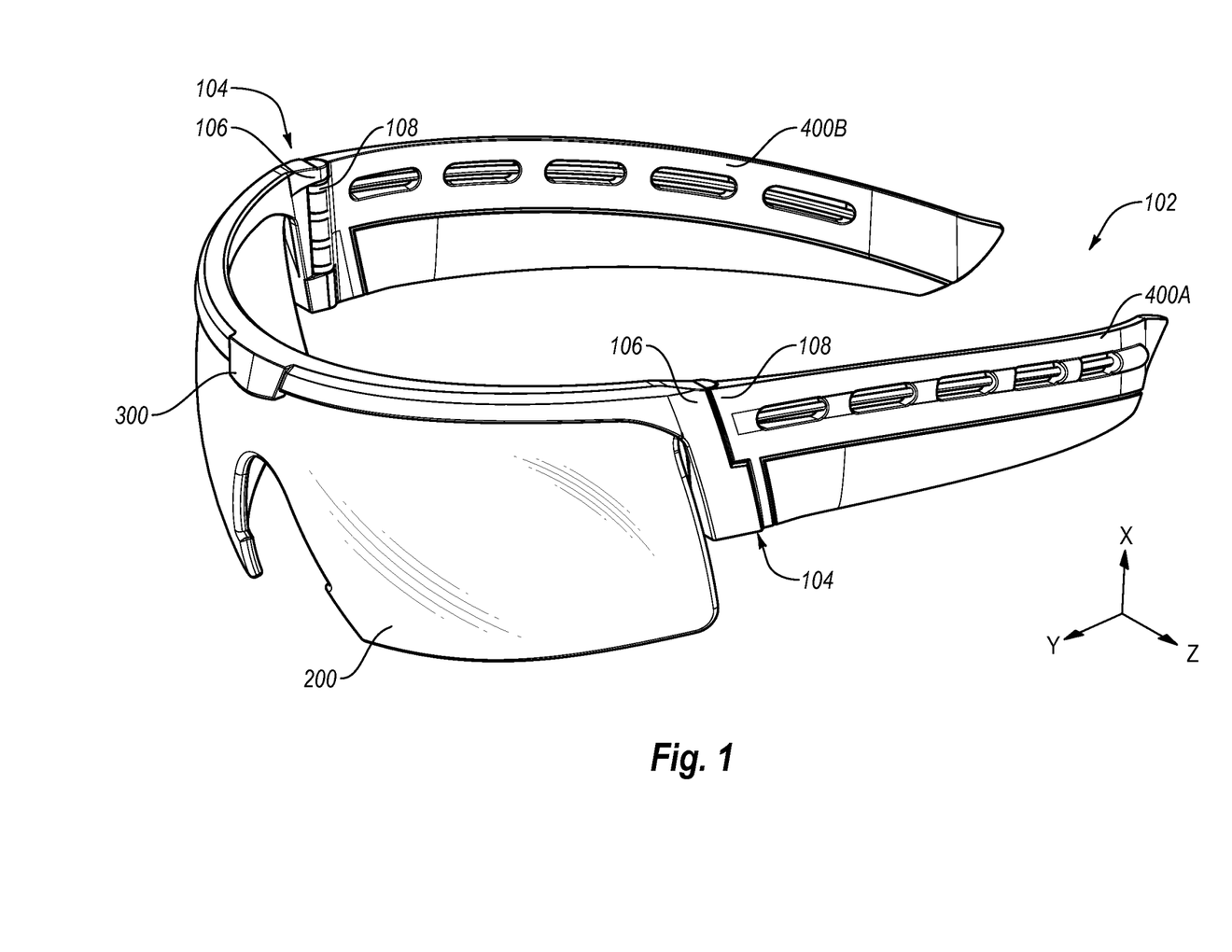
FIG. 1 illustrates example eyewear.

FIG. 1 illustrates example eyewear 100. The eyewear 100 may provide protection for a user (not shown) by placing a lens 200 between eyes of the user and any material potentially introduced into the eyes of the user. Functionality of the eyewear 100 is not limited to protection of the eyes of the user. Additionally or alternatively, the eyewear may be worn to reduce ambient lighting, for stylistic reasons, etc.

The eyewear 100 includes temple assemblies 400A and 400B (generally, temple assembly 400 or temple assemblies 400) that are configured to secure the eyewear to the head of the user, to retain the position of the eyewear on the head of the user, and provide this functionality while maintaining general comfort of the user. Additionally, the eyewear 100 may be configured such that the temple assemblies 400A and 400B enable the user to wear the eyewear 100 in combination with additional equipment. For example, the eyewear 100 may enable the user to wear the eyewear 100 with head equipment and/or hearing/communication equipment. Some specific examples of the head equipment may include, but are not limited to, a combat helmet, a military helmet, a sporting helmet, headphones, a security helmet, a hard hat, or safety helmet. Some specific examples of the hearing/communication equipment may include, but are not limited to, headphones for radio communication, protective hearing devices, circumaural headphones, supra-aural headphones, or noise-reducing ear cups. Some additional details of the eyewear 100 used with additional equipment are provided below.

The eyewear 100 may be symmetric with respect to a bisecting xy-plane in an arbitrarily-defined coordinate system. The symmetry of the eyewear 100 separates the overall structure of the eyewear 100 such that a left side of eyewear 100 is essentially identical, but a reflection of the right side of the eyewear. For example, a left temple assembly 400A, a left half of the lens 200, and a left half of a brow piece 300 may include substantially identical structures to a right temple assembly 400B, a right half of the lens 200, and a right half of the brow piece 300.

A head of the user may be introduced into a volume largely surrounded by the eyewear 100. The volume is generally indicated in FIG. 1 by arrow 102. With the head of the user introduced in the volume 102, the left temple assembly 400A may be oriented and/or positioned generally on a left side of the head of the user. Likewise, with the head of the user introduced in the volume 102, a right temple assembly 400B may be oriented and/or generally positioned on a right side of head of the user. As used herein, the right temple assembly 400B and the left temple assembly 400A may be generally referred to as temple assemblies 400 or the temple assembly 400.

The temple assemblies may be connected to the brow piece 300 by hinges 104A and 104B (generally, hinge 104 or hinges 104). Each of the hinges 104 may include a first portion 106 integrally formed to the brow piece 300 and a second portion 108 integrally formed in the one of the temple assemblies 400. In some embodiment, the first portion 106 is composed of the same material as the brow piece 300 and the second portion 104 is composed of the same material as the temple assemblies 400.

The hinges 104 enable the rotation of the temple assemblies 400. For example, the hinges 104 may enable the temple assemblies 400 to rotate into the volume 102 to allow a user to store the eyewear 100.

Figure 2A:
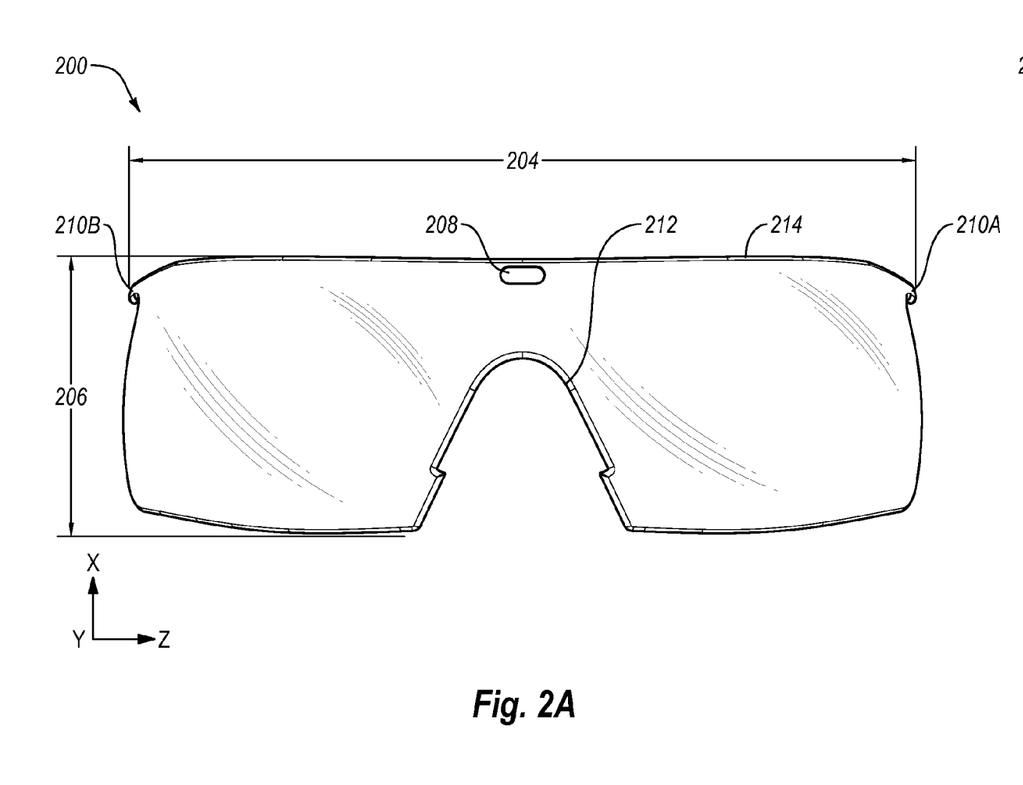
FIGS. 2A and 2B illustrates some additional details of an example lens that may be included in the eyewear of FIG. 1.
Figure 2B:
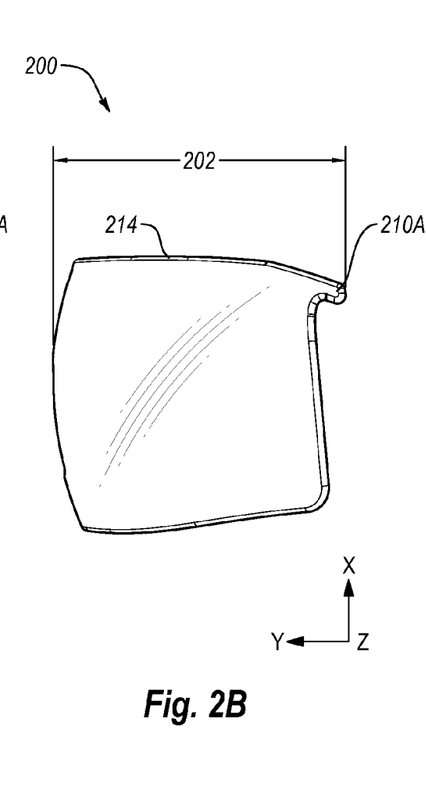

FIGS. 2A and 2B illustrates some additional details of the lens 200 that may be included in the eyewear 100 of FIG. 1. The lens 200 may be composed of one or more polymers, copolymer, reinforced polymers and/or polymer blends. Additionally, the lens 200 may include one or more functional lens coatings. The lens 200 may provide protection against penetration of material fragments, for instance. The lens 200 may be substantially transparent and may include a tint or a color in some embodiments. Additionally, the lens 200 may be configured such that a corrective (Rx) lens may be inserted between the eyes of the user and the lens 200 or the lens 200 may substantially include an Rx lens in some embodiments.

The lens 200 may include a lens depth 202. The lens depth 202 may position the lens 200 within a specific distance from a user's face and may provide protection from material fragments entering the eyes of the user from the side. The lens depth 202 may also allow the use of external optical equipment such as night vision goggles. For example, the night vision goggles may be attached to a helmet and may be rotated to be positioned in front of the lens 200 during use. The lens depth 202 may allow for use of the night vision goggles without interfering with the lens 200.

The lens 200 may also include a lens length 204 and a lens height 206. Like the lens depth 202, the lens length 204 and the lens height 206 may enable the lens 200 to cover the face and/or eyes of the user. Additionally or alternatively, the lens length 204 and the lens height 206 may be sized to accommodate external optical equipment and/or Rx lenses.

The lens 200 may also define a nosepiece cutout 212. The nosepiece cutout 212 may be sized to receive a nosepiece (not shown). For example, the nosepiece cutout 212 may be sized to receive a commercially available or standardized nosepiece.

With combined reference to FIGS. 1 and 2A-2B, the lens 200 may be attached to the brow piece 300 by edge lens tabs 210A and 210B and/or by a central lens retainer 208 such as a hole, a protrusion, a tab, etc. The central lens retainer 208 and the edge lens tabs 210A and 210B may be sized to engage corresponding structures in the brow piece to secure the lens 200 to the brow piece 300. Additionally or alternatively, the central lens retainer 208 and the edge lens tabs 210A and 210B may enable the lens 200 to be removed from the brow piece 300. By removing the lens 200 from the brow piece 300, a lens 200 having a different color or function may be attached to the brow piece 300 or a damaged lens 200 may be easily replaced.

Figure 3:
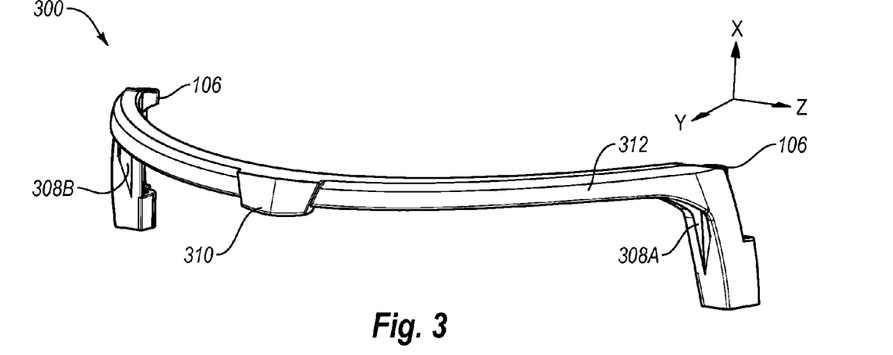
FIG. 3 illustrates an example brow piece that may be implemented in the eyewear of FIG. 1.

FIG. 3 illustrates some additional details of the brow piece 300 that may be implemented in the eyewear 100 of FIG. 1. With combined reference to FIGS. 1 and 3, the brow piece 300 may be connected to the temple assemblies 400 by the hinges 104 and secure the lens 200 to the eyewear 100. The brow piece 300 may generally extend along the forehead of a user when the user is wearing the eyewear 100. Additionally, the brow piece 300 may provide overall structural support for the eyewear 100.

With specific reference to FIG. 3, the brow piece 300 may be composed of one or more metals, one or more polymers, copolymer, reinforced polymers and/or polymer blends. The material selection may be based, at least partially, on considerations such as overall stresses imposed during use, durability during the life of the eyewear 100, etc. In some embodiments, the brow piece 300 may be composed of nylon or a nylon resin such as nylon-66. In other embodiments, the brow piece 300 may be composed of an alternative material with similar chemical and/or mechanical properties.

The brow piece 300 includes a brow piece length 304, a brow piece height 306, and a brow piece depth 302 (collectively, brow piece dimensions 302, 304, 306). In some embodiments, the brow piece dimensions 302, 304, 306 may be sized to accommodate a particular lens, such as lens 200 of FIGS. 2A and 2B. Alternatively, the brow piece dimensions 302, 304, 306 may be sized to fit a common size of a group of users. For example, the brow piece 300 may be sized for one or more face-head morphologies and/or face sizes. The brow piece dimensions 302, 304, 306 may also be based on the portion of the face of the user the eyewear 100 protects.

In some embodiments, the brow piece dimensions 302, 304, 306 may be sized to accommodate external optical equipment. Specifically, brow piece dimensions 302, 304, 306 may position the eyewear to reduce or eliminate interference with the external optical equipment. As above, an example of external optical equipment may include night vision goggles that may be positioned in front of the brow piece 300 during use. Additionally or alternatively, brow piece dimensions 302, 304, 306 may position the eyewear low enough on the head of a user to reduce or eliminate interference with headwear such as a helmet.

With combined reference to FIGS. 2A, 2B, and 3, the brow piece 300 may include one or more structures 308A, 308B, and 310 configured to receive or engage the central lens retainer 208 or the edge lens tabs 210A and 210B. Specifically, a brow piece tab 310 may engage the central lens retainer 208 and lens receivers 308A and 308B may receive the edge lens tabs 210A and 210B. Additionally in this and other embodiments, the brow piece 300 includes a channel in a brow piece top 312 that receives a top 214 of the lens 200.

The brow piece 300 may also include the first portions 106 of the hinges 104 of FIG. 1. The first portions 106 may be integrally formed with the brow piece 300 and accordingly may be composed of the same material as the brow piece 300. Alternatively, in some embodiments, the first portions 106 may be composed of another material and affixed or otherwise attached to the brow piece 300.

Figure 4A:
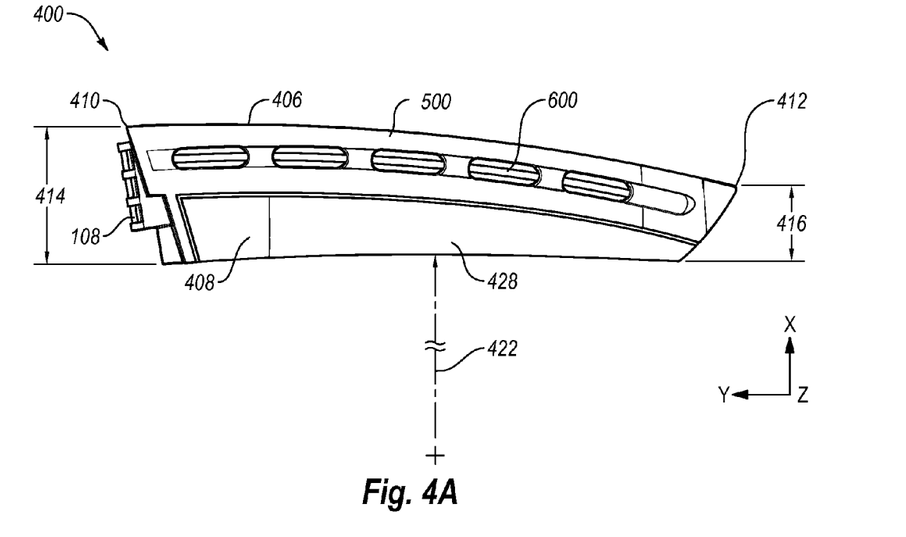
FIGS. 4A-4C illustrate some additional details of example temple assemblies that may be implemented in the eyewear of FIG. 1.
Figure 4B:
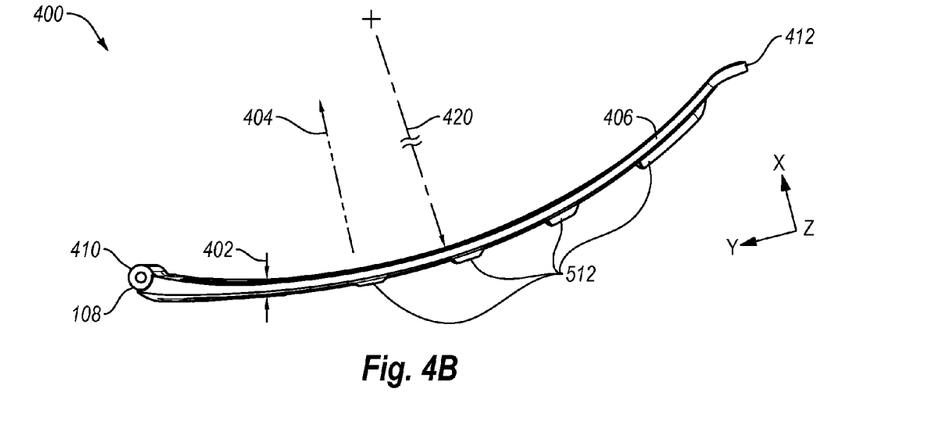
Figure 4C:
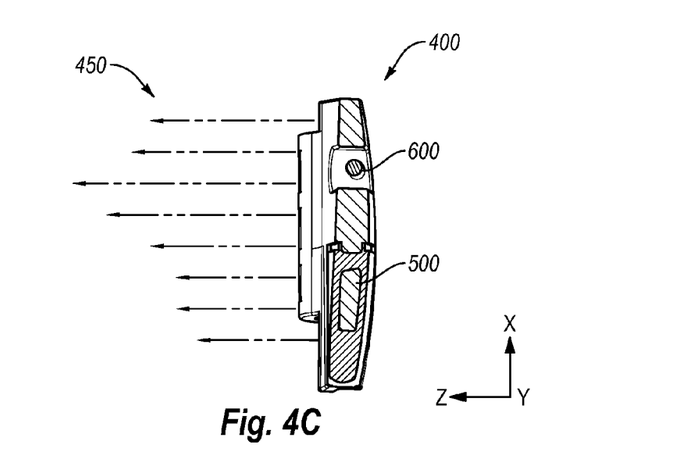

FIGS. 4A-4C illustrate some additional details of the temple assemblies 400 that may be implemented in the eyewear 100 of FIG. 1. FIGS. 4A-4C illustrate the left temple assembly 400A, however the right temple assembly 400B includes similar features and components in a symmetric structure. Specifically, FIG. 4A depicts a transparent side view of the temple assembly 400, FIG. 4B depicts a top view of the temple assembly 400, and FIG. 4C depicts a front view of the temple assembly 400.

With combined reference to FIGS. 4A-4C, the temple assembly 400 includes a temple substrate 500, a covered portion 428, and a metal insert 600. As best depicted in FIG. 4A, the metal insert 600 may be positioned within the temple substrate 500 and the covered portion 428 may be formed onto the temple substrate 500. The metal insert 600, located within the temple substrate 500, may provide a spring force to at least partially secure eyewear, such as the eyewear 100, to the head of a user. Additionally, the metal insert 600 may at least partially retain the position of the eyewear 100 to the head of the user. The spring force may generally act in the direction indicated by arrow 404 in FIG. 4B. The arrow 404 is substantially normal to the metal insert 600. While a single arrow 404 is depicted in FIG. 4B, the spring force acts substantially normally along the length of the metal insert 600, thereby providing a substantially even distribution of the spring force against the head of the user. As used herein, the direction of the arrow 404 is referenced to as "inward" and generally refers to a direction towards the head of a user. Conversely, the term "outward" generally refers to a direction opposite of the arrow 404 and away from the head of a user.

The spring force may additionally be distributed along a height of the temple assembly 400. Referring to FIG. 4C, the spring force may be primarily imposed by the metal insert 600 by the temple substrate 500 and/or the covered portion 428 which act to distribute the spring force. An example distribution of the spring force along the height of the temple assembly 400 is represented in FIG. 4C by arrows 450. The longer arrows represent a higher force.

In this and other embodiments, the temple substrate 500 may rotate or bend about the metal insert 600. That is, the temple substrate 500 may rotate axially about the metal insert 600 enabling the temple substrate 500 to conform and/or deform at least partially independently of the metal insert 600. Additionally or alternatively, the temple substrate 500 may bend about the metal insert 600. For example, when the metal insert 600 includes a flat strip of material, the temple substrate 500 may bend about the metal insert 600.

The rotation and/or bending about the metal insert 600 may be caused by a shape of the head of a user or by interference with additional equipment worn in combination with eyewear including the temple assembly 400. For example, when eyewear including the temple assembly 400 is not being worn, a temple assembly top 406 and a temple assembly bottom 408 may be aligned. However, when a user is wearing the eyewear including the temple assembly 400, the temple assembly top 406 may rotate inward and/or the temple assembly bottom 408 may rotate outward about the metal insert 600 to conform to the head of the user.

Additionally, the temple substrate 500 may rotate and/or bend about the metal insert 600 different amounts between a first end 410 of the temple assembly 400 and a second end 412 of the temple assembly 400. For example, at or around the first end 410, the temple substrate 500 may not rotate and the temple assembly top 406 may be substantially aligned with the temple assembly bottom 408. However, at or around the second end 412, the temple substrate 500 may rotate or bend about the metal insert 600 such that the temple assembly top 406 may be substantially aligned with the temple assembly bottom 408. Rotating or bending about the metal insert 600 may be enabled due to a lack of permanent attachment between at least some portion of the metal insert 600 and the temple substrate 500. For example, the metal insert 600 may be permanently attached at or around the first end 410 and the second end 412, but not permanently attached between the first end 410 and the second end 412.

Alternatively, the metal insert 600 and the temple substrate 500 may be permanently attached along the entire metal insert 600. In these and other embodiments, a similar rotation or bending may be enabled due to materials in which the metal insert 600 and the temple substrate 500 are composed. For example, the metal insert 600 may be composed of a first material that is substantially rigid and super elastic while the temple substrate 500 may be composed of a second material that is substantially flexible compared to the first material. The temple substrate 500 may accordingly bend and/or rotate about the metal insert 600.

Generally, rotating or bending about the metal insert 600 may contribute to comfort or reduce discomfort of the user while wearing eyewear including the temple assembly 400 or the eyewear in combination with additional equipment. For example, a user may wear the eyewear including the temple assembly 400 in conjunction with circumaural headphones. In this and other examples, the temple substrate 500 may not rotate about the metal insert 600 near the first end 410. However, a portion of the temple substrate 500 over which the circumaural headphones fit may rotate about the metal insert 600 such that temple substrate is substantially flat against the head of the user to reduce or eliminate discomfort caused by material pressed against the ears of the user. Additionally, in this example, the functionality of the circumaural headphones and the eyewear is maintained both while both are worn and if one of the circumaural headphones or the eyewear is removed.

Additionally, the rotating or bending about the metal insert 600 may also contribute to the retention of the eyewear 100 during use. By conforming to the head of the user, a majority of the temple assembly may be in contact with the head of the user. Accordingly, the eyewear 100 may maintain position on the head of the user during shifting or rotation of the head.

In some embodiments, there may be additional rotation and/or bending of the temple assembly 400 at or around the hinge 104 of FIG. 1. Specifically, the temple substrate 500 rotate or bend in relationship to the brow piece 300 and/or the lens 200 disclosed herein.

As best depicted in FIGS. 4A and 4B, the temple assembly 400 may also include an inward curve 420 and/or a downward curve 422 from the first end 410 to the second end 412. The inward curve 420 and the downward curve 422 are represented on FIGS. 4A and 4B respectively by an X and a line indicating a center point and a radius. While the inward curve 420 and the downward curve 422 include a single radius, the inward curve 420 and/or the downward curve 422 may include one or more curvatures between the first end 410 and the second end 412 without limitation. For example, the inward curve 420 may include a first radius during a first portion of the temple assembly 400 and a second radius during a second portion of the temple assembly.

In some embodiments, the inward curve 420 and the downward curve 422 may contribute to the stability, functionality, and/or comfort of eyewear including the temple assembly 400. For example, the inward curve 420 may at least partially provide an inward force against the head of a user. Additionally, the downward curve 422 may move the position of the eyewear, including the temple assembly 400, away from the ears of a user up higher on the head of the user.

The inward curve 420 and/or the downward curve 422 may distort or change. For example, when the temple substrate 500 rotates or bends about the metal insert 600, the inward curve 420 and/or the downward curve 422 may distort.

Additionally or alternatively, the temple assembly 400 may narrow or taper in height from the first end 410 to the second end 412. Referring to FIG. 4A, the temple assembly 400 may include a first temple height 414 at the first end 410, which may be greater than a second temple height 416 at the second end 412. Like the inward curve 420 and/or the downward curve 422, the first temple height 414 being greater than the second temple height 416 may contribute to the stability, functionality, and/or comfort of eyewear including the temple assembly 400.

As best shown in FIG. 4B, the temple assembly 400 may also include an assembly thickness 402. Generally, the assembly thickness 402 varies from the first end 410 to the second end 412 and from the temple assembly top 406 to the temple assembly bottom 408. In this and other embodiments, the assembly thickness 402 at the first end 410 is greater than the assembly thickness 402 at the second end 412. Specifically, the assembly thickness 402 tapers from the first end 410 to the second end 412. Additionally, in this and other embodiments, the assembly thickness 402 at the temple assembly top 406 is greater than the assembly thickness 402 at the temple assembly bottom 408. Specifically, the assembly thickness 402 tapers from the temple assembly top 406 to the temple assembly bottom 408.

Additionally in some embodiments, the assembly thickness 402 may be related to one or more metal insert supports 512. The metal insert supports 512 may support the metal insert 600 such that the assembly thickness 402 may be reduced. For example, the metal insert 600 may be a limiting structure in reducing the assembly thickness 402. By including the metal insert supports 512, the assembly thickness 402 may be reduced while supporting the metal insert 600 in the temple substrate 500. Accordingly, at one or more portions of the temple assembly 400, the thickest portion of the assembly thickness 402 may correspond to the location of the metal insert supports 512.

With specific reference to FIG. 4A, the metal insert 600 is shown located within the temple substrate 500. The metal insert 600 includes a mechanical interlock 602 at least partially secured in the temple substrate 500. The mechanical interlock 602 may at least partially anchor the metal insert 600 within the temple substrate 500. For example, in some embodiments, the metal insert 600 may be substantially a wire. The mechanical interlock 602 may prevent the entire metal insert 600 from rotating relative to the browpiece 300 and/or the temple substrate 500 during use.

Additionally, in some embodiments, the mechanical interlock 602 is not included in the second portion 108 of the hinge 104 of FIG. 1. Instead, the second portion 108 is integrally formed as part of the temple substrate 500, set away from the hinge 104. By not including the metal insert 600 in the second portion 108 of the hinge 104, the metal insert 600 may provide the spring force 404, but the location of the metal insert 600 in the temple substrate 500 may vary. For example, the metal insert 600 may be located near the temple assembly top 406.

The covered portion 428 may be formed on the temple substrate 500. For example, the covered portion 428 may be overmolded onto the temple substrate 500. The covered portion 428 may increase the comfort of eyewear including the temple assembly 400. Specifically, the covered portion 428 may create the temple assembly bottom 408 and may be composed of a material that is soft and flexible compared to the metal insert 600 and/or the temple substrate 500. During use, the covered portion 428 may rest along the head of a user and/or behind the ears of the user. The covered portion 428 may be substantially flexible to conform and/or deform with the temple substrate 500 independently of the temple substrate 500. Additionally, the covered portion 428 may be thinner than the assembly thickness 402. Specifically, in some embodiments, the covered portion 428 may be the thinnest portion of the temple assembly 400.

The temple substrate 500, the covered portion 428, and the metal insert 600 may be composed of different materials. For example, in some embodiments, the metal insert 600 may be composed of a first material having sufficient rigidity and elastic deformation properties to impose the spring force 404 to secure and retain the eyewear to the head of the user. The first material may additionally have elastic deformation properties allowing for the repeated elastic deformation during use of the eyewear. Thus, the first material may be stressed or bent repeatedly without plastically deforming. For example, the first material may be a metal or metal alloy such as nickel titanium that may include a pre-loaded spring force as discussed above.

The temple substrate 500 may be composed of a second material that may allow rotation and/or bending about the metal insert 600 but also provide some support for the overall structure of the temple assembly 400. In some embodiments, the temple substrate 500 is composed of one or more polymers, copolymer, reinforced polymers and/or polymer blends. For example, the temple substrate 500 may be composed of a nylon-66 or a nylon-12.

The covered portion 428 may be composed of a third material that provides comfort when in contact with the head and/or the ears of a user. Additionally, the third material may be flexible compared to the temple substrate 500 and the metal insert 600 to easily contour to the head and/or ears of the user. The third material may be selected at least partially based on considerations including comfort, flexibility, ease of formation onto the temple substrate 500, etc. In some embodiments, the covered portion 428 is composed of one or more polymers, copolymer, reinforced polymers and/or polymer blends. For example, the covered portion 428 may be composed of a thermoplastic elastomer. The third material and the second material do not have to be a completely different material. For example, the third material and the second material may be the same except the third material may include a different durometer than the second material.

Figure 5A:
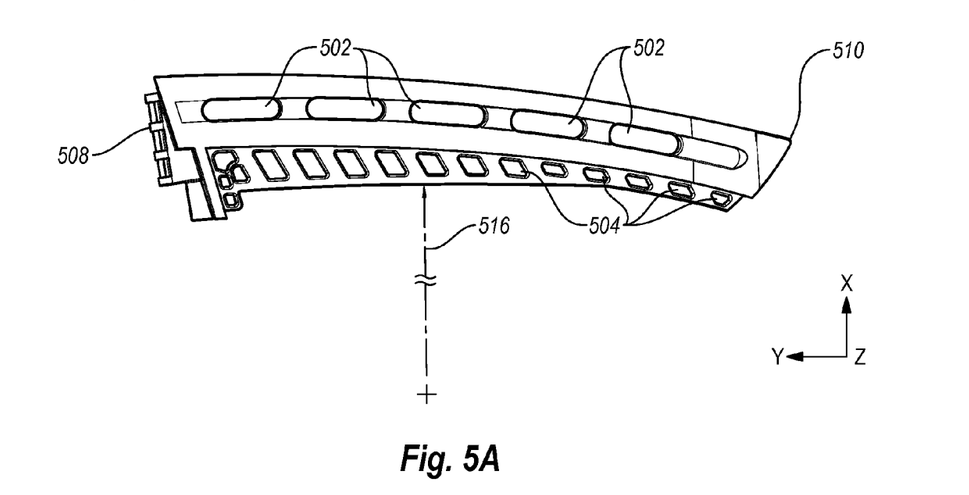
FIGS. 5A and 5B illustrate some additional details of an example temple substrate that may be included in the temple assembly of FIGS. 4A-4C.
Figure 5B:
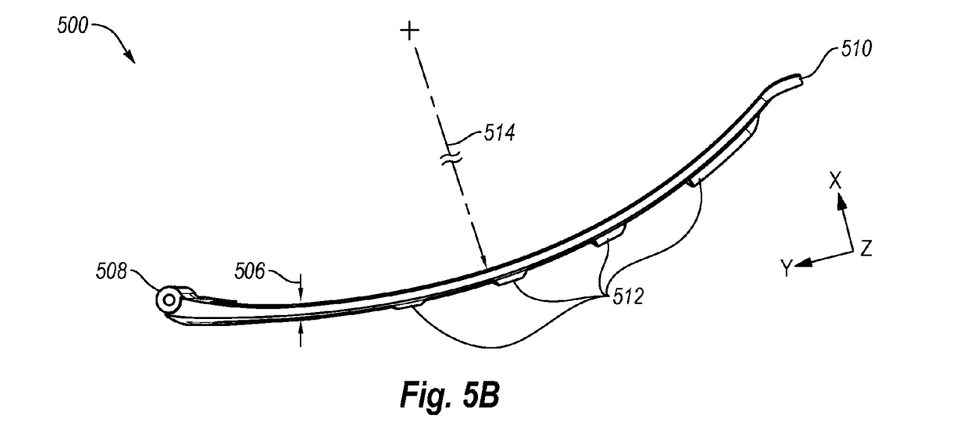

FIGS. 5A and 5B illustrate some additional details of the temple substrate 500 that may be included in the temple assembly 400 of FIGS. 4A-4C. The temple substrate 500 depicted in FIGS. 5A and 5B does not include the metal insert 600 or the covered portion 428 discussed elsewhere herein. As best illustrated in FIG. 5A, the temple substrate 500 defines the metal insert holes 502 and covered portion holes 504. The metal insert holes 502 and the covered portion holes 504 may reduce the overall weight and/or rigidity of the temple substrate 500. Additionally, the metal insert holes 502 may provide relief between the metal insert 600 discussed herein and the temple substrate 500. The covered portion holes 504 may additionally provide a coupling mechanism by which the covered portion 428 of FIGS. 4A-4C discussed herein is mechanically coupled to the temple substrate 500. The configuration, number, and arrangement of the covered portion holes 504 and/or the metal insert holes 502 in FIG. 5A are illustrative and may vary in other embodiments.

As best depicted in FIG. 5B, the substrate thickness 506 decreases between a first substrate end 508 and a second substrate end 510. To contain the metal insert 600 discussed elsewhere herein at the second substrate end 510, the temple substrate 500 may include the metal insert supports 512 between the metal insert holes 502. The metal insert supports 512 surround a portion of the metal insert. By including the metal insert supports 512 and reducing the substrate thickness 506, the temple substrate 500 may be more flexible at the second substrate end 510 than at the first substrate end 508.

Additionally, the temple substrate 500 may include a substrate inward curvature 514 (FIG. 5B) and a substrate downward curvature 516 (FIG. 5A). The substrate inward curvature 514 and the substrate downward curvature 516 are represented by an X and a line indicating a center point and a radius. The substrate inward curvature 514 may substantially correspond to the inward curvature 420 of FIG. 4B and the substrate downward curvature 516 may substantially correspond to the downward curvature 422 of FIG. 4A. During use, the substrate inward curvature 514 and/or the substrate downward curvature 516 may deform or contour as discussed above.

Figure 6A:
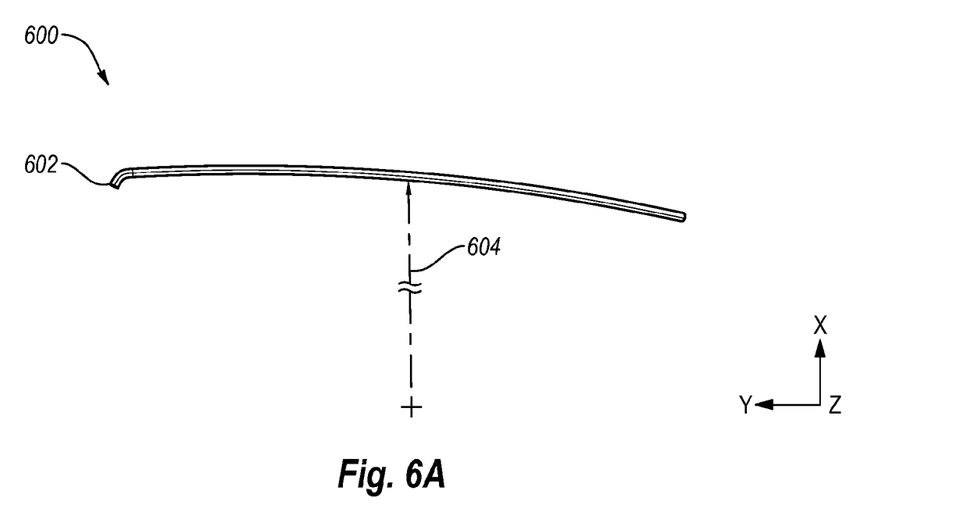
FIGS. 6A and 6B illustrate some additional details of an example metal insert that may be implemented in the temple assembly of FIGS. 4A-4C.
Figure 6B:
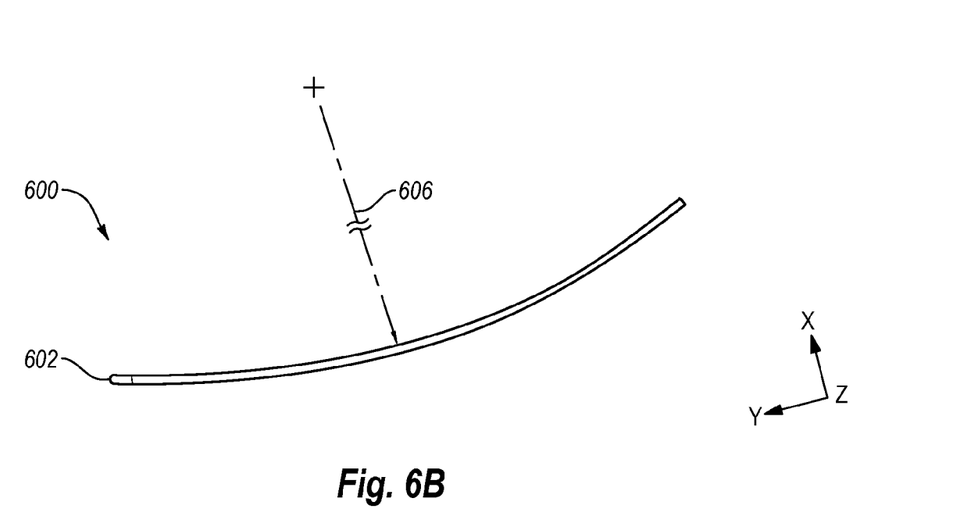

FIGS. 6A-6B illustrate some additional details of the metal insert 600 that may be implemented in the temple assembly 400 of FIGS. 4A-4C. In some embodiments, the metal insert 600 generally includes a cylindrical rod, a wire, or a curved plate, for instance. Accordingly, the metal insert 600 may include a cross-sectional shape such as a circle, an oval, or a rectangular cross sectional shape. Alternatively, the cross-sectional shape may include an irregular or asymmetric shape. In some of these embodiments, the temple substrate 500 may bend about the metal insert 600 rather than rotating about the metal insert 600.

The metal insert 600 may be formed, forged, or bent such that the metal insert 600 includes a metal insert inward curvature 606 (FIG. 6B), a metal insert downward curvature 604 (FIG. 6A), and the mechanical interlock 602 discussed above. The metal insert inward curvature 606 and the metal insert downward curvature 604 are represented by an X and a line indicating a center point and a radius. The metal insert inward curvature 606 may substantially correspond to the inward curvature 420 of FIG. 4B and the metal insert downward curvature 604 may substantially correspond to the downward curvature 422 of FIG. 4A. During use, the metal insert inward curvature 606 and/or the metal insert downward curvature 604 may deform or contour as discussed above.

The mechanical interlock 602 may at least partially secure the metal insert 600 within the temple substrate 500 discussed elsewhere herein. The mechanical interlock 602 may include a portion of the metal insert 600 adequate to prevent the rotation of the entire metal insert 600 in the temple substrate 500. In some embodiments, for example, about 3% of the metal insert 600 may be included in the mechanical interlock 602. The metal insert downward curvature 604, the metal insert inward curvature 606, the mechanical interlock 602, or any combination thereof may be bent or formed in the metal insert 600 through a bending process. Alternatively, the metal insert downward curvature 604, the metal insert inward curvature 606, the mechanical interlock 602, or any combination thereof may be extruded or stamped.

Figure 7A:
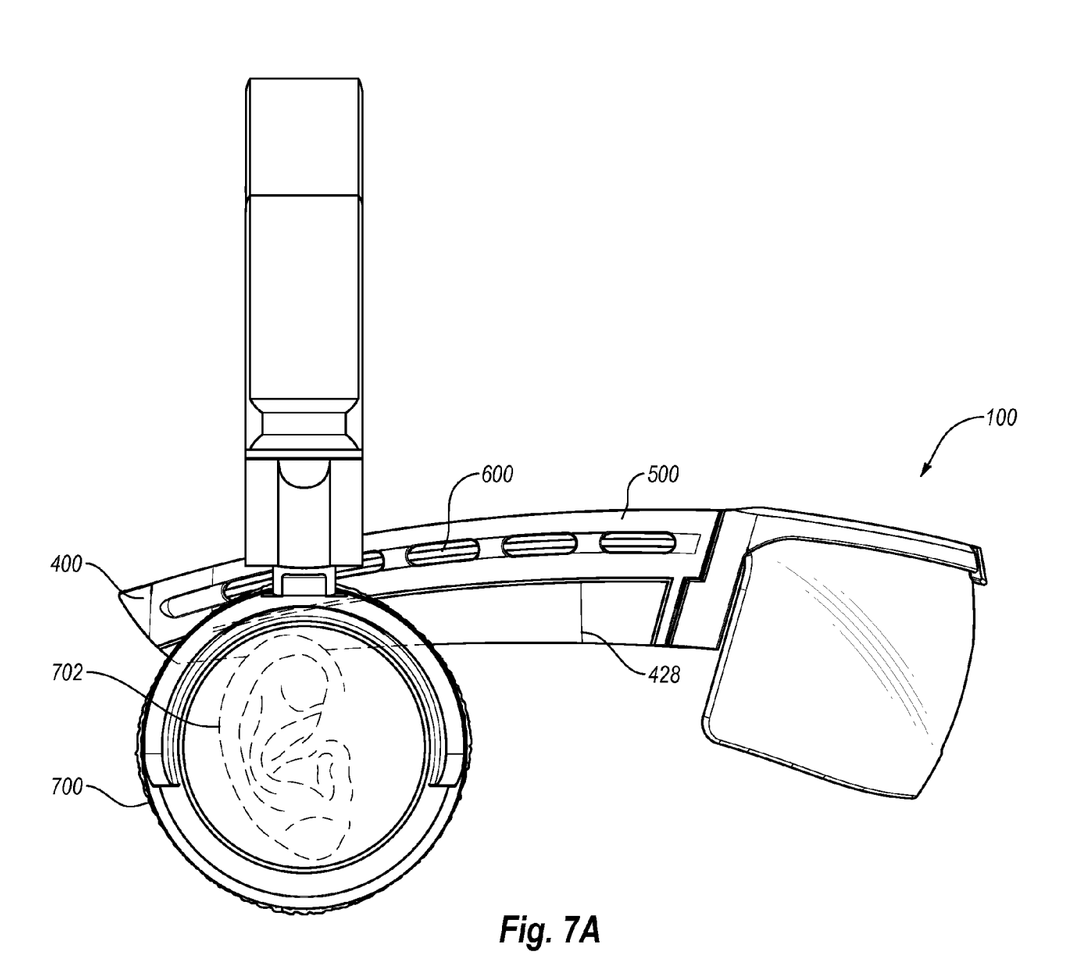
FIGS. 7A and 7B illustrate the eyewear of FIG. 1 worn in combination with example additional equipment, all arranged in accordance with at least some embodiments described herein.
Figure 7B:
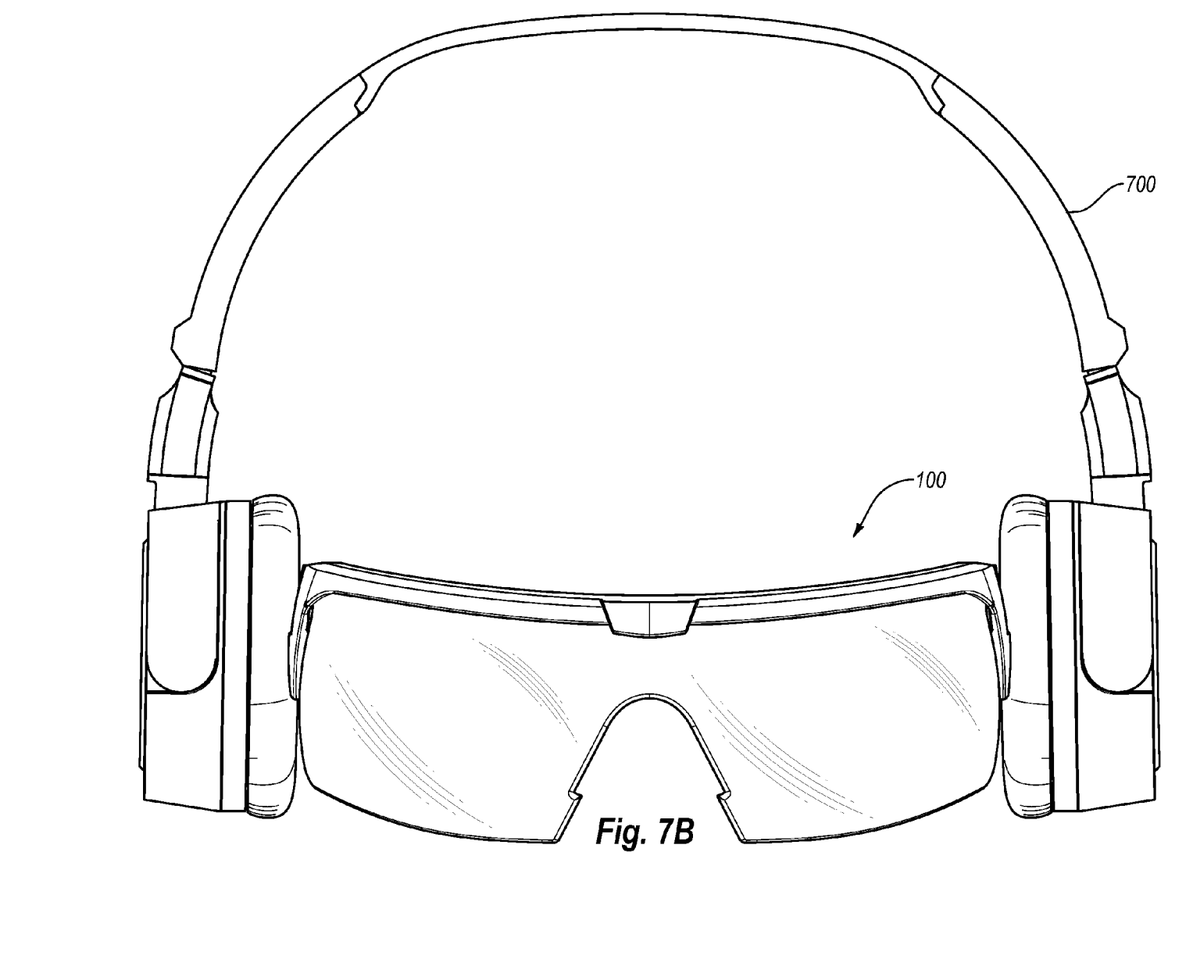

FIGS. 7A and 7B illustrate the eyewear 100 of FIG. 1 worn in combination with additional equipment. Specifically, FIG. 7A depicts a side view of the eyewear 100 worn in combination with circumaural ear cups 700 (hereinafter, "ear cups"). The ear cups 700 in FIG. 7A are depicted transparently to show an ear 702 of a user. FIG. 7B depicts a front view of the eyewear 100 worn in combination with the ear cups 700. The ear cups 700 are included in FIGS. 7A and 7B as a non-limiting example of the additional equipment that may be used in conjunction with the eyewear 100. Note, in some embodiments, one or more features of the additional equipment may additionally be positioned between the eyewear 100 and the head of the user. For example, a strap securing a helmet may be positioned between the eyewear 100 and the head of the user.

FIGS. 7A and 7B include the covered portion 428, the temple substrate 500, the temple assembly 400, and the metal insert 600 which are described above with respect to one or more of FIGS. 4A-6B. The description of the covered portion 428, the temple substrate 500, the temple assembly 400, and the metal insert 600 are not repeated here.

As depicted in FIGS. 7A and 7B, when a user wears the ear cups 700 with the eyewear 100, the ear cups 700 may apply pressure to at least some portion of the ear 702. Generally, the ear cups 700 apply an inward force that secures the ear cups 700 to the head of the user. Thus, the ear cups 700 may press on a top or an upper portion of the ear 702 that may retain the eyewear 100. The ear cups 700 may deform the ear 702 against the substrate assembly 400.

However, any discomfort that may result from deforming the ear 702 is reduced because the ear cups 700 apply pressure to the covered portion 428, which may correspond to the thinnest portion of the temple assembly 400. More specifically, the metal insert 600, which may correlate to the thickest portion of the temple assembly 400, may be located inside the temple substrate 500 above the ear 702. The metal insert 600 thus provides the spring force to secure the eyewear 100 to the head of the user but may not rest behind the ear 702 or any portion thereof to which pressure is applied by the ear cups 700. Accordingly, any discomfort caused by the ear cups 700 applying pressure to the ear 702 is reduced or eliminated.

The present invention may be embodied in other specific forms without departing from its spirit. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. Eyewear comprising:
a lens;
a brow piece configured to position the lens in front of eyes of a user during use; and
two temple assemblies coupled to the brow piece by two hinges, each of the temple assemblies configured to extend along a side of a head of the user during use, each of the temple assemblies including:
a temple substrate;
a covered portion included on a portion of the temple substrate, the covered portion configured to be positioned above an ear of the user during use; and
an insert at least partially located within the temple substrate, the insert including an inward curvature configured to impose a spring load against the head of the user to at least partially secure the eyewear to the head of the user during use and, wherein the insert is configured to allow the temple substrate to rotate axially about at least a portion of the insert such that the temple substrate deforms relative to the insert and at least partially independently of the insert during use.

2. The eyewear of claim 1, wherein:
the temple substrate is composed of a first material;
the insert is composed of a second material; and
the second material is super elastic and the first material is flexible in comparison to the second material.

3. The eyewear of claim 2, wherein:
the insert includes nickel titanium;
the temple substrate includes a copolymer; and
the covered portion includes a thermoplastic elastomer.

4. The eyewear of claim 1, further comprising two hinges, wherein:
the brow piece defines a first portion of each of the two hinges,
the temple substrate integrally forms a second portion of each of the two hinges;
the insert includes a first end positioned at a hinge portion of the temple substrate; and
the insert includes a mechanical interlock at the first end that prevents rotation of the temple substrate at the hinge portion.

5. The eyewear of claim 1, wherein the insert includes a cross section that is circular, oval, or rectangular.

6. The eyewear of claim 1, wherein:
the insert is located in another portion of the temple substrate separate from the portion of the temple substrate on which the covered portion is formed; and
the portion of the temple substrate in which the insert is located is farther from the ear of the user than the portion of the temple substrate on which the covered portion is formed during use.

7. The eyewear of claim 6, wherein:
the portion of the temple substrate in which the insert is at least partially located has a first thickness and the portion of the temple substrate on which the covered portion is formed has a second thickness; and
the first thickness is greater than the second thickness.

8. The eyewear of claim 1, wherein the temple substrate is configured to distribute the spring load along a height of the temple substrate during use.

9. The eyewear of claim 1, wherein:
the covered portion is the thinnest portion of the temple assembly; and
the covered portion is configured to be positioned between the ear and the head of the user during use.

10. The eyewear of claim 1, wherein:
one or more portions of the insert are not permanently attached to the temple substrate, and
the temple substrate rotates axially about the portions of the insert not permanently attached to the temple substrate.

11. Eyewear configured to be worn in conjunction with additional headgear, the eyewear comprising a temple assembly including:
a temple substrate configured to extend along a side of a head of a user during use, the temple substrate including a first portion and a second portion, wherein the first portion is located farther from an ear of the user than the second portion during use, the first portion includes a temple assembly top, and the second portion includes a temple assembly bottom;
an insert at least partially located within the first portion of the temple substrate, the insert including an inward bend configured to exert an inward spring force against the head of the user during use and a downward curvature configured to deform to the head of the user during use, wherein the insert is configured to allow the temple substrate to rotate axially about at least a portion of the insert such that the temple substrate deforms relative to the insert and at least partially independently of the insert; and
a covered portion included on the second portion of the temple substrate.

12. The eyewear of claim 11, wherein a height of the temple assembly enables the second portion to rest on the ear of the user and enables the insert to apply the spring force against the side of the head of the user during use.

13. The eyewear of claim 11, wherein the covered portion is:
the thinnest portion of the temple assembly, and
an independent component separable from the second portion of the temple substrate.

14. The eyewear of claim 13, wherein the covered portion is configured to be positioned between the ear and the side of the head of the user during use.

15. The eyewear of claim 14, wherein:
the temple substrate includes a copolymer;
the covered portion includes a thermoplastic elastomer; and
the insert includes nickel titanium.

16. The eyewear of claim 11, wherein the additional headgear includes one or more of a combat helmet, circumaural ear cups, a military helmet, a sporting helmet, headphones, a security helmet, a hard hat, and a safety helmet.

17. A temple assembly comprising:
a temple substrate including a portion of a hinge, a temple assembly top, a first portion, and a second portion, the first portion being positioned between the temple assembly top and the second portion; and
an insert at least partially located within the first portion of the temple substrate, the insert configured to impose a spring load against a head of a user during use, the spring load being distributed by the temple substrate such that a largest portion of the spring load is primarily impose by the insert to secure the temple substrate to the head of the user, and the insert being configured to allow the substrate to rotate axially about at least a portion of the insert such that the temple substrate deforms relative to the insert and at least partially independently of the insert.

18. The temple assembly of claim 17, wherein:
the temple substrate includes a first material;
the insert includes a second material; and
the second material is super elastic and the first material is flexible in comparison to the second material.

19. The eyewear of claim 17, wherein:
the insert includes a first end positioned at the portion of the hinge of the temple substrate; and
the insert includes a mechanical interlock at the first end that is configured to reduce an angle of rotation of the temple substrate relative to the insert in an area around the portion of the hinge.

20. The eyewear of claim 17, further comprising a covered portion formed on the second portion of the temple substrate, the covered portion configured to rest on an ear of the user during use.

* * * * *